United States Patent Office 3,500,647
Patented Mar. 17, 1970

3,500,647
WATER DISTRIBUTION SYSTEM FOR CANALS
Gilles Combes and Alexandre Preissmann, Grenoble, France, assignors to Societe Grenobloise d'Etudes et d'Applications Hydrauliques (SOGREAH), Grenoble, Isere, France, a corporation of France
Filed Sept. 13, 1968, Ser. No. 759,728
Claims priority, application France, Sept. 21, 1967, 5,171
Int. Cl. E02b 7/36
U.S. Cl. 61—22          9 Claims

ABSTRACT OF THE DISCLOSURE

Means are provided at both the upstream and downstream ends of an irrigation canal reach to simultaneously measure the water levels thereat. These measurements are transmitted to means capable of combining them in a given proportion representative of the level of the water at a given intermediate point of the reach and of controlling the operation of a gate at the upstream end of the reach.

The invention

This invention relates to irrigation canals, and more particularly to means for controlling the demand for water in such canals.

Various discharge control arrangements have been devised for major irrigation canals by means of which the operations of the canals are governed by the demand for water. One of such arrangements involves what is referred to by the art as "discharge control from downstream" or "downstream discharge control." In such a system, whenever a demand makes itself felt, automatic gates open as necessary to allow the whole canal to flow at the requisite rate down each reach in succession. The sides of each of these reaches are usually constructed to provide the particular reach with sufficient freeboard to enable it to store and make readily available a quantity of water capable of immediately satisfying any demand that might be called for at the downstream end thereof. Since in the conventional downstream control system, the automatic gate at the upstream end of a reach is usually activated by a float immediately downstream of it, the required freeboard therefore may be quite considerable. This is especially so if the irrigation canal has a shallow slope and very long reaches. The necessity for such freeboard necessarily results in a substantial increase in the cost of the canal structure and such cost as in the case of the canal with a shallow slope and long reaches, may be wellnigh prohibitive for certain installations.

The primary purpose of the present invention is to provide a water level detection method which will make it possible to operate the canal structure just as effectively as known downstream discharge control systems with materially less operating liquid storage in the reaches thereof, thereby enabling the required freeboard of such reaches to be reduced to such extent as to effect a considerable saving in the cost of the canal structure.

Figure 1:
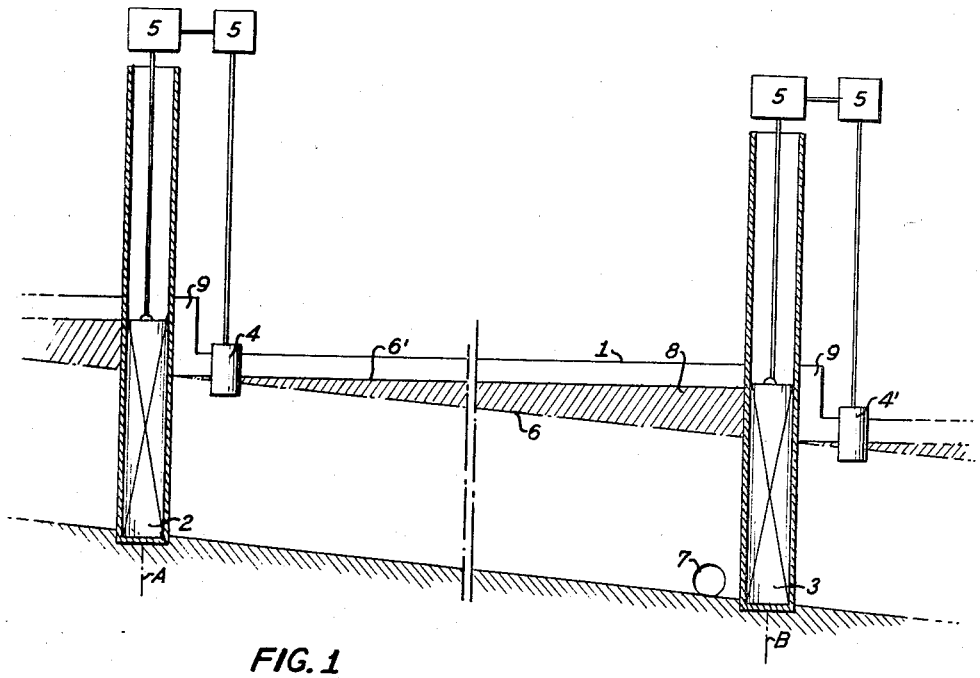
Figure 2:
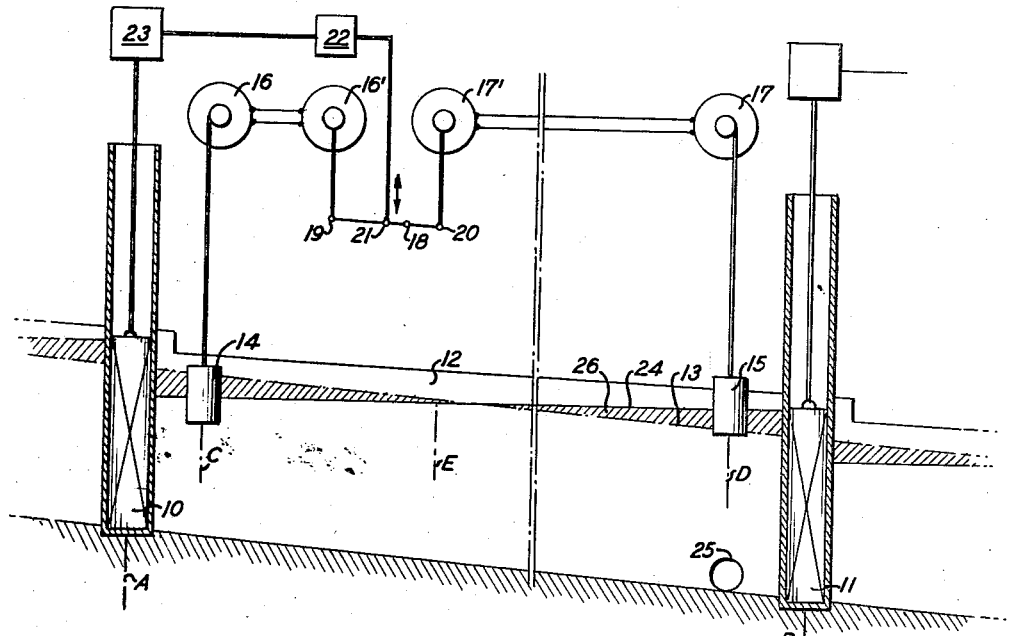

For a better understanding of the invention, as well as the features of novelty thereof, reference is made to the accompanying drawings, in which FIG. 1 is a diagrammatic view of a conventional downstream automatic gate control system; and FIG. 2 is a diagrammatic view of an automatic gate control system embodying the invention.

As is shown in FIG. 1 of the drawings, the reaches in an irrigation canal system are each usually located between an upstream automatic gate 2 and a downstream automatic gate 3. The banks of the reach AB shown in full in FIG. 1 are indicated by the reference numeral 1, and the outlet of such reach from which a flow is drawn off therefrom, is indicated by the reference numeral 7. The two automatic gates 2 and 3 are controlled from downstream by their respective floats 4 and 4'. The floats may either simply detect the water levels in their respective reaches and actuate the gates through servo-mechanisms, such as the servo-mechanisms designated 5 shown in FIG. 1, or the floats may be constructed to combine the functions of a detector and a motor and operate the gates themselves, as is known. In a conventional downstream control system of this type the gate 2 is designed to maintain the level of the water in the reach AB at the float 4, at a practically constant value. The water surface for the no-flow condition in the reach AB is indicated by the full line 6', and the water surface at maximum discharge with all of the gates in the system open, is indicated by the dashed line 6. It will be noted that in the no-flow condition of the reach AB there will have been built up within the reach i.e., within the area defined by the lines 6, 6', a volume of water that is intended to immediately satisfy any demand that may be made for water through the outlet 7. This area which is cross-hatched and designated 8 in FIG. 1, may be termed the operational storage area for the reach AB.

It will be understood from the foregoing, that in the conventional downstream control system, when a flow of water is drawn off from a reach AB thereof through the outlet 7 of such reach, a negative wave or depression propagates upstream toward the float 4. After a time interval $\Delta t$ the negative wave reaches the float 4 and the latter causes the gate 2 to start opening. During the wave propagation time $\Delta t$, the water in the operational storage area 8 in the reach AB will supply the necessary quantity of water for immediate satisfaction of the demand at 7. It will be understood, that in order to provide the necessary quantity of storage liquid for such an operation the side walls 1 of the reach AB should be built high enough to provide a certain amount of freeboard, and that this freeboard may be quite considerable in irrigation canals that have a shallow slope and very long reaches, thereby making the construction of such a structure quite costly.

Referring now to FIG. 2 of the drawings, which shows a structure embodying the invention and designed to overcome the above indicated disadvantage of the conventional downstream control system. In accordance with the invention, this is accomplished by providing a double water level detection system capable of simultaneously detecting the water levels at the upstream and downstream ends of a canal reach, combining such two readings in given proportions according to a selected level at a predetermined intermediate point of such reach, and controlling the gate at the upstream end of the reach by the resultant of such combination. The system will then operate as though the gate were controlled by the water level at such intermediate point of the canal reach.

In FIG. 2 of the drawings, the aforesaid predetermined intermediate point in the canal reach AB is designated E and the aforesaid proportions are represented by the lengths EA and EB. If these proportions are 1:1, this is the equivalent of controlling the water level mid-way along the reach at the average value between A and B. Under such type of control, when a flow is drawn off at the downstream end of the reach and a depression is propagated upstream, as above explained, the gate at the upstream end of the reach which is controlled by the average between the upstream and downstream levels in the reach, will at the same time begin to open and cause a flood flow to move downstream in the reach. After a time interval $\Delta t/2$, the flood flow will meet the depression traveling upstream practically at the half-way point of the reach. It will thus be seen that in the construction of FIG. 2, the transition from the no-flow water level or surface to the maximum flow water surface takes place much more quickly than with a conventional downstream discharge control system such as shown in FIG. 1, so that less operating storage need be provided for. This enables the freeboard to be considerably reduced, thereby resulting in an appreciable saving in structural costs. Where the waves do not travel at the same rate throughout the reach, or where stability is an important factor, the proportions in which the upstream and downstream water level measurements in the reach are combined may be adjusted accordingly to take care of such factors.

For a clearer understanding of the invention, there will now be explained in detail, by way of example, the arrangement shown in FIG. 2 of the drawings. The irrigation canal reach AB shown in such figure, as in the embodiment of FIG. 1, is located between two automatic gates designated 10 and 11. The canal banks or freeboard of the reach is designated 12, and the water surfaces for maximum flow and no-flow conditions are indicated by the dashed line 13 and the full line 24, respectively. In accordance with the invention, the water levels at both ends C, D, of the reach are detected simultaneously by floats 14 and 15, respectively. The floats transmit their level indications via selsyns 16, 16' and 17, 17' to a device capable of combining such indications in predetermined proportions. Such device, as is shown in FIG. 2, may be composed of an arm 18 connected at its ends 19 and 20 to the selsyns 16', 17', respectively, so that such arm ends 19 and 20 are given movements by the selsyns proportionate to the level measurements of the floats 14 and 15, respectively. The upward or downward movements of the center 21 of arm 18 will represent the average of the changes in the levels at C and D detected by the floats 14 and 15. The arm 18 is connected at point 21 to an amplification system 22 controlling a servo-motor 23 for operating the upstream gate 10. Thus, any change in the vertical position of arm point 21 due to the aforesaid movement of the ends of such arm, will cause a corresponding change in the position of the operating gate 10 to effect a practically constant level at the point E halfway along the reach AB.

It will be understood from the foregoing, that when a flow is drawn off at the outlet 25 of the reach AB, a depression will travel upstream toward the upstream end of such reach. Substantially simultaneously due to the change in the water level at the downstream end D of the reach caused by the creation of such depression at the outlet 25, the float 15 which is located directly over such outlet, will send an indication of such change through the selsyn 17, 17' the arm 18, and the amplification system 22 to cause the servo-motor 23 to start gate 10 to open and send a flood flow from A down towards B. This flood flow will meet the depression at E after a time interval $\Delta t/2$ ($\Delta t$ being the time required for the wave to travel from A to B). As a consequence, the transition from the no-flow water surface 24 to the maximum-flow water surface 13 will take place more rapidly than in a conventional downstream discharge control system. As a result of such rapid transistion, the reach requires less operating storage 26 and the freeboard 12 of the reach can be substantially reduced. Some indication of the extent of these advantageous differences may be obtained from a comparison of the cross-hatched storage areas 8 and 26 and the freeboard areas 1 and 12 in FIGS. 1 and 2, respectively. As previously indicated, where the waves do not travel at the same rate throughout the reach, or where necessary for stability, the position of point 21 on the arm 18 can be varied to have the predetermined level controlled at some other point between the reach ends C and D than the mid-point E.

What is claimed is:

1. A control system for a reach in an irrigation canal, comprising a reach having an automatic gate at its upstream end and an outlet spaced downstream from such gate, and means connected to said gate and having parts located to simultaneously detect changes in the water levels in such reach at a first place adjacently downstream of such gate and at a second place in the region of said outlet, said means being constructed and arranged to combine the indications of said parts to provide resultant indications comparable to estimated changes in the water level at a predetermined point of said reach, and to utilize such resultant indications to control said gate so as to maintain a practically constant given water level at such point.

2. A control system as defined in claim 1, in which said means comprises indicating means including said parts for simultaneously indicating the changes in the water levels at such places and for translating such indications into indications proportionate to the lengths of said reach between said point and said parts, means for combining such indications in such proportions, and means connected to and controlled by said combining means for operating said gate.

3. A control system as defined in claim 2, in which said part of said indicating means at said second place is located directly over said outlet so that it will immediately detect a change in the water level at such place when a flow is drawn off through said outlet.

4. A control system as defined in claim 2, in which said part of said indicating means at said second place is located at the downstream end of said reach.

5. A control system as defined in claim 2, in which said parts of said indicating means are constituted of floats located at said places, and said indicating means includes selsyn means connected to each float and to said combining means.

6. A control system as defined in claim 5, in which said combining means comprises a free arm connected at its ends to the selsyn means associated with said floats, said connected means being connected to an intermediate point on said arm and including a motor controlled by the movement of said intermediate arm point.

7. The method of controlling the flow of water in an irrigation canal reach having an automatic gate at its upstream end and an outlet spaced downstream from such gate, comprising simultaneously determining changes in the water levels in the reach at a first place adjacently downstream of such gate and at a second place in the region of the outlet, then combining the determination at such places to provide resultant level indications comparable to estimated changes at a predetermined point of such reach, and then utilizing such resultant indications to control the gate so as to maintain a practically constant given water level at such point.

8. The method defined in claim 7, in which the determinations made at such places are translated into indications proportionate to the lengths of the reach between said point and said places before combining them to obtain said resultant indications.

9. The method defined in claim 7, in which the place in the region of the outlet is located at the downstream end of the reach and directly over the outlet.

References Cited
UNITED STATES PATENTS

| | | | |
|---|---|---|---|
| 917,381 | 3/1909 | Twiford | 61—23 |
| 1,059,116 | 3/1913 | Chapin | 61—23 |
| 1,738,051 | 12/1929 | Harker | 61—23 |

PETER M. CAUN, Primary Examiner